United States Patent [19]

Davis

[11] 4,103,420
[45] Aug. 1, 1978

[54] UTENSIL WITH GREASE SHIELD

[76] Inventor: Albert F. Davis, 2148 W. Washburne, Chicago, Ill. 60608

[21] Appl. No.: 727,253

[22] Filed: Sep. 27, 1976

Related U.S. Application Data

[63] Continuation-in-part of Ser. No. 627,235, Oct. 30, 1975, abandoned.

[51] Int. Cl.² .................................................. A47J 43/28
[52] U.S. Cl. ...................................... 30/129; 30/323; 294/131
[58] Field of Search .................... 30/129, 323, 128; 294/131, 61; 99/421 A

[56] References Cited

U.S. PATENT DOCUMENTS

| 689,778 | 12/1901 | Barnard | 30/323 X |
|---|---|---|---|
| 1,993,314 | 3/1935 | Belford | 294/61 |
| 2,315,143 | 3/1943 | Thompson | 294/61 X |
| 2,695,188 | 11/1954 | Klausman | 294/61 |
| 2,873,522 | 2/1959 | Homola | 30/129 |
| 3,858,320 | 1/1975 | Neal | 30/323 |

Primary Examiner—Jimmy C. Peters
Attorney, Agent, or Firm—Eugene F. Friedman

[57] ABSTRACT

A cooking utensil having a removable grease shield in the form of a screen to protect the hand of the person using it. The utensil includes the usual elongated manipulating device for making contact with the food item involved. At one end of the device appears the usual handle to allow a person to hold it. The shield fits on to the device, extends laterally from it, and provides a barrier to grease droplets or other hot particles that could burn. The shield couples to the manipulating device and may have a fixed orientation with respect to it. Moving the food manipulator, as a result, will not dislodge the shield to an inconvenient location. The utensil may also include an ejector for dislodging food held by the manipulator. This becomes important where the shield impedes access to the food held by the utensil. The food ejector, controlled in the region of the handle, consequently passes through the shield.

15 Claims, 21 Drawing Figures

UTENSIL WITH GREASE SHIELD

CROSS-REFERENCE TO RELATED APPLICATION

The subject application represents a continuation-in-part of U.S. patent application Ser. No. 627,235, filed Oct. 30, 1975, and now abandoned.

BACKGROUND OF THE INVENTION

Splattering grease often accompanies the frying of various foods. Such grease can reach to the hand of the cook attending the food and inflict painful and perhaps serious burns. Barbecuing and grilling also results in particles of food or charcoal emanating in various directions. Moreover, the large open area of a grill can produce amounts of heat intolerable to the hand of the person attending to the food.

To ameliorate and avoid such injuries, the shafts of various cooking utensils, especially those for outdoor barbecuing, having grown considerably in length. Such extra-length implements, while reducing somewhat the problems alluded to above, have not completely avoided them; grease droplets can fly considerable distances. Moreover, the extended lengths on the shafts render the utensils awkward to use at best.

In a further effort to provide a modicum of protection to its user, the fork in U.S. Pat. No. 3,858,320 to J. Neal et al. slides a shield, in the form of a screen, onto its shaft. The shield, however, blocks the access to an item of food held by the tongs of the fork. It may no longer remain possible even to scrape the item of food off onto a plate. Using an implement in the second hand to dislodge the food, the cook runs the previous risk of having that hand burned. The problem becomes particularly acute during the process of simply turning food over, which requires placing the food on the fork back onto the fire.

Furthermore, Neal et al.'s shield slides onto the utensil's shaft and has only a frictional engagement with it. Consequently, moving the fork around, for example to turn an item of food over, may well cause the shield to change its position upon the fork. Thus, although the shield may previously have occupied an inconvenient location at best, it may subsequently move to one which renders the fork almost useless. Constant use of the fork will accordingly require frequent adjustment of the screen.

A shield for pots appears in H. R. Barnard's U.S. Pat. No. 689,788. Similar to the shield in Neal et al., it may move around on the pot handle. Furthermore, its sole contact while on the pot handle derives from two sleeves urged into contact with the handle by the arms of a coil spring. When that spring wears down or bends out of shape, the shield will no longer stay where placed on the handle. Furthermore, as with Neal et al., the shield presents an effective barrier to attending to the contents of the pot. Consequently, an approach to the pot from the side of the shield becomes necessary and may result in the total loss of the shield's benefits.

A. Young, in his U.S. Pat. No. 550,768, and R. L. Homola, in his U.S. Pat. No. 2,873,522, show forks with devices for removing food held on them. However, the necessity for these implements does not readily appear from the patents themselves.

Consequently, the search continues for a utensil having a protective barrier that effectively protects the hand of its user. Moreover, it should not unduly interfere with the use of the utensil and not require constant attention during such use.

The same attributes represent desirable features in implements intended for use with hot items other than food. For example, logs in a fire frequently spit out sparks especially when undergoing a change of their position to provide a better fire. A shield on a poker employed by a person undertaking this task can also protect him from injury of varying degrees.

SUMMARY

Typically, a hot item utensil includes an elongated manipulator which has a handle at one end with which a person may hold it. At its other end, it includes a moving means or component which makes contact with the appropriate heated item. Once in contact, of course, it may perform the intended operation.

To provide protection against burns, the utensil should also include some sort of shield. At its minimum, the shield should prevent heated particles from burning the hand of the individual employing the utensil. Thus, it should prevent such particles, traveling in a substantially straight line, from reaching the area near the handle after originating in the region near the moving means, that is, the end away from the handle. Any protection beyond that will depend upon the intended use of the utensil as well as the needs and desires of its various users.

Rather than the shield merely sliding on to the manipulator, the utensil may further include a coupler that retains the manipulator and the shield together. It should retain the shield at a predetermined location on, and with a fixed orientation relative to, the manipulator. As a consequence, it will eliminate undesired motion between the shield and the manipulator caused by the normal use of the utensil.

Specifically, the coupler may include two parts with one rigidly affixed to the manipulator and the other similarly affixed to the shield. The two parts may then engage each other holding the manipulator and the shield at the desired fixed orientation with respect to each other. To change this fixed orientation would then require mutual disengagement of the first and second coupler parts.

As a separate aspect, the utensil may include, in addition to the shield, an ejector or remover for expelling a hot item in contact with the moving means end of the manipulator. For a fork, the remover simply pushes the food away from the handle until it can slip off the prongs.

The remover or ejector, of course, should generally have an actuating portion in the region of the handle. Accordingly, it must contend with the presence of the shield between the handle and the other end of the manipulator. Conveniently, it may do so by passing through an opening in the shield itself. In fact, the opening through the shield may have sufficient size to enable the shield to pass over one of the ends of the manipulator. This obviates the necessity to disassemble the manipulator in order to attach the shield.

Providing a remover for a utensil with a shield allows complete control of the utensil without the necessity of exposing an appendage. Removing an item from the utensil simply involves moving the thumb, for example, to actuate the remover. This occurs behind the protection provided by the shield.

DETAILED DESCRIPTION

Figures 1, 2:
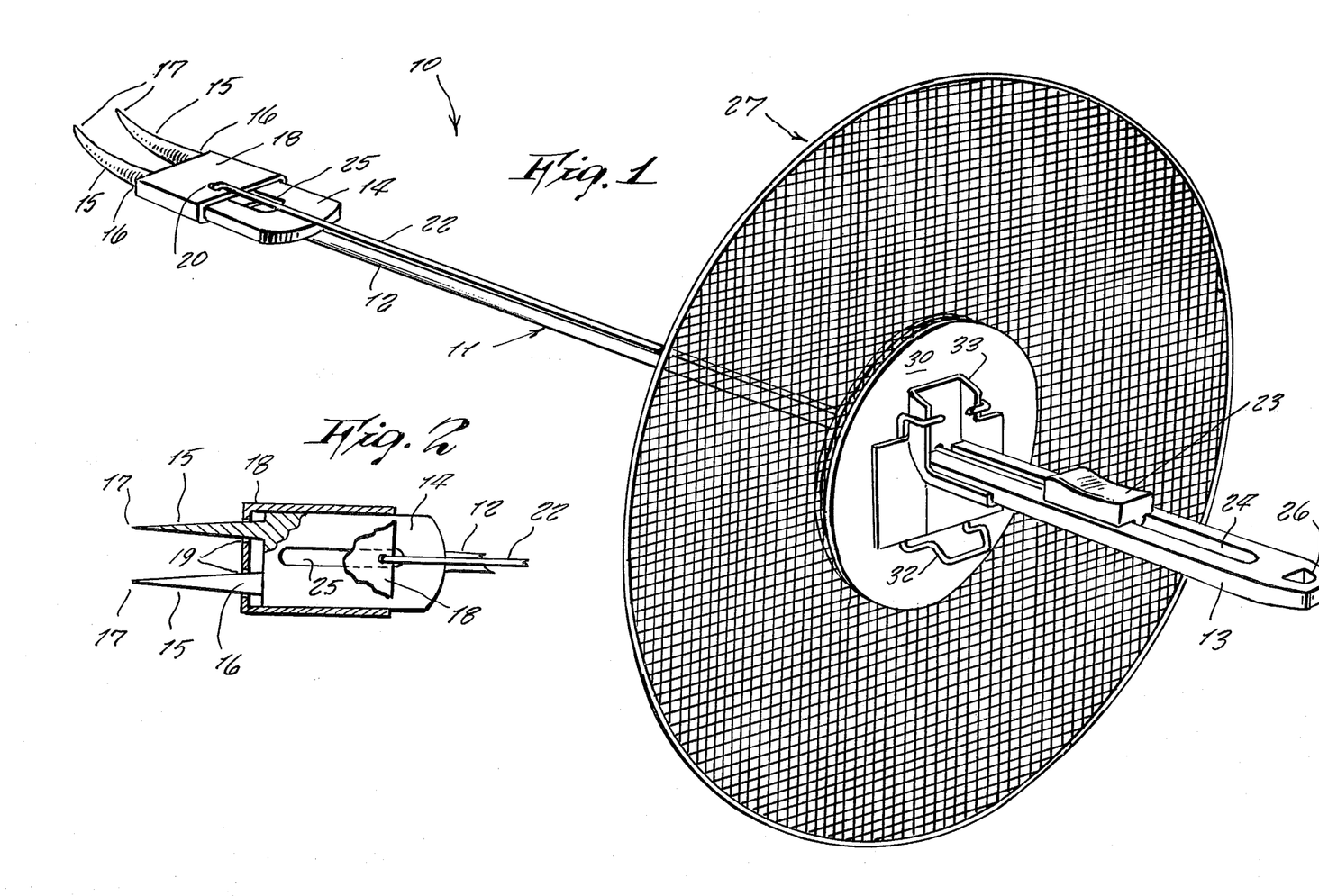
FIG. 1 presents a perspective view of a fork having a grease shield with a fixed orientation and an ejector for removing food.
FIG. 2 gives a partially sectional top plan view of the fork and the pushing portion of the food ejector.

In FIG. 1, a shielded utensil appears generally at 10. This utensil 10 includes first the fork 11 with an elongated shaft 12. At its rear, the shaft 12 joins with the handle 13, and, at its forward end, the plate 14. The plate 14, in turn, forms into the prongs 15 which lie parallel to each other but curve upward from their base 16 to their tips 17.

Figures 4, 5, 6:
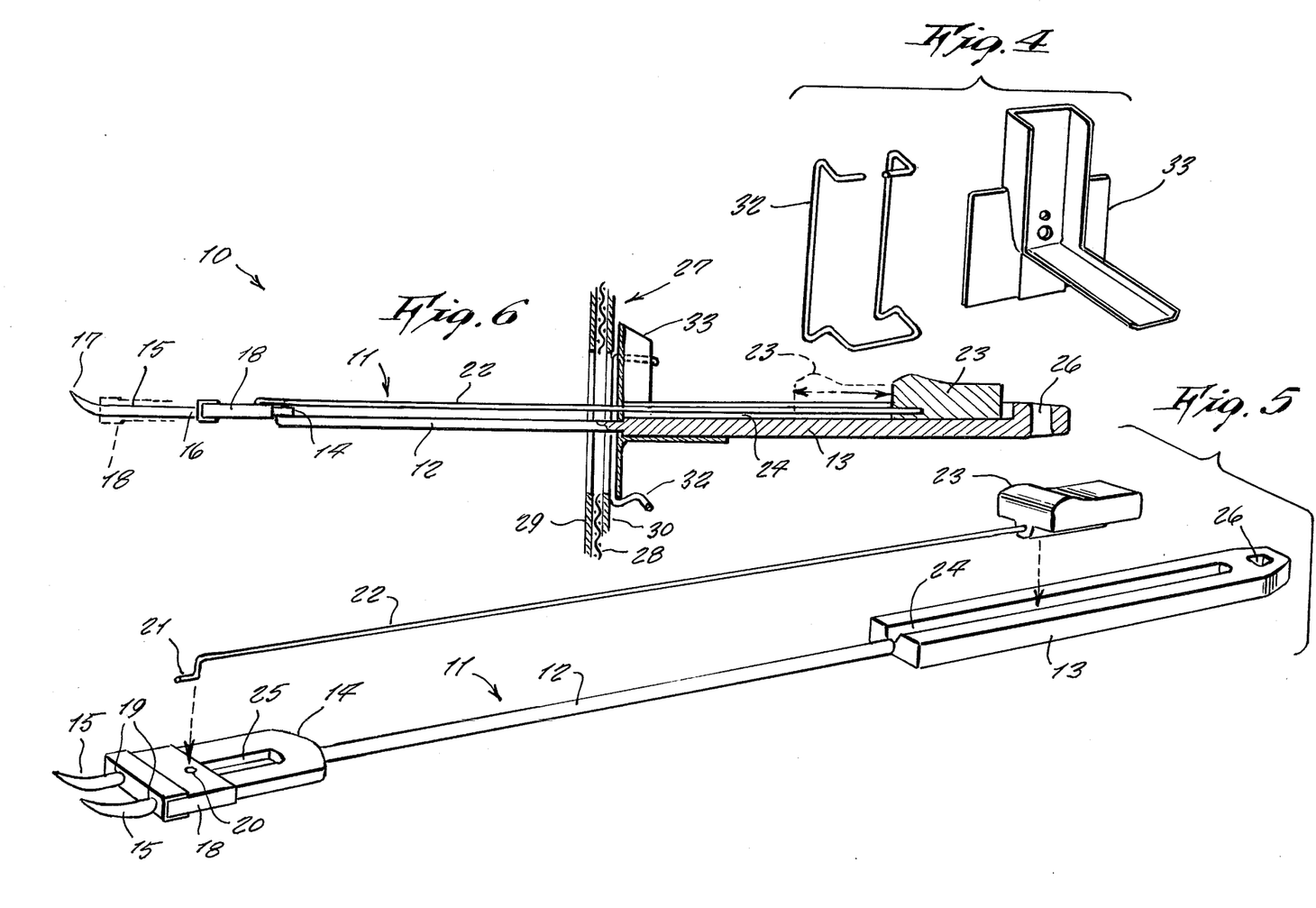
FIG. 4 depicts the hook bracket and handle mount which forms one type of coupling device for attaching the shield to the fork.
FIG. 5 gives a partially exploded view of the fork with ejector mechanism for removing food.
FIG. 6 gives a cross-sectional view from the side of the utensil of FIG. 1.

As shown in FIGS. 2 and 5, the food dispenser or pusher 18 slides upon the plate 14. The forward end of the dispenser 18 has a pair of openings 19 through which the prongs 15 extend. The surface between the openings 19 assist in making contact with the food in order to push it off the fork 11.

The upper side of the dispenser 18 includes the opening 20 which receives the downwardly offset forward end 21 of the push rod 22. At its rear end, the rod 22 connects to a thumb button or actuator 23. Because of these interconnections, the dispenser 18, the push rod 22, and, thus, the actuator 23 move along the fork 11 as a single unit.

The thumb actuator 23 lies within the longitudinally extending groove 24 formed within the upper side of the handle 13 of the fork 11 as seen from FIG. 5. Because of the location of the actuator 23, a person's thumb may slide it back and forth in the groove 24. Moving with it, the dispenser 18 slides upon the plate 14 of the fork 11. Consequently, the openings 19 in the dispenser 18 move between the bases 16 and the tips 17 of the prongs 15, and the food impaled by the prongs moves away from the bases 16 until it becomes clear of the fork 11.

FIG. 6 shows, in phantom, the position of the dispenser 18 along the prongs 15 after the thumb actuator 23 has moved to the ejecting position, also shown in phantom. The slot 25 accommodates the motion of the offset end 21 of the rod 22 as it undergoes these motions.

The handle 13 of the fork 11 includes, through it, an opening 26. This allows its placement upon a hanger for the fork's storage when not in use.

Figure 3:
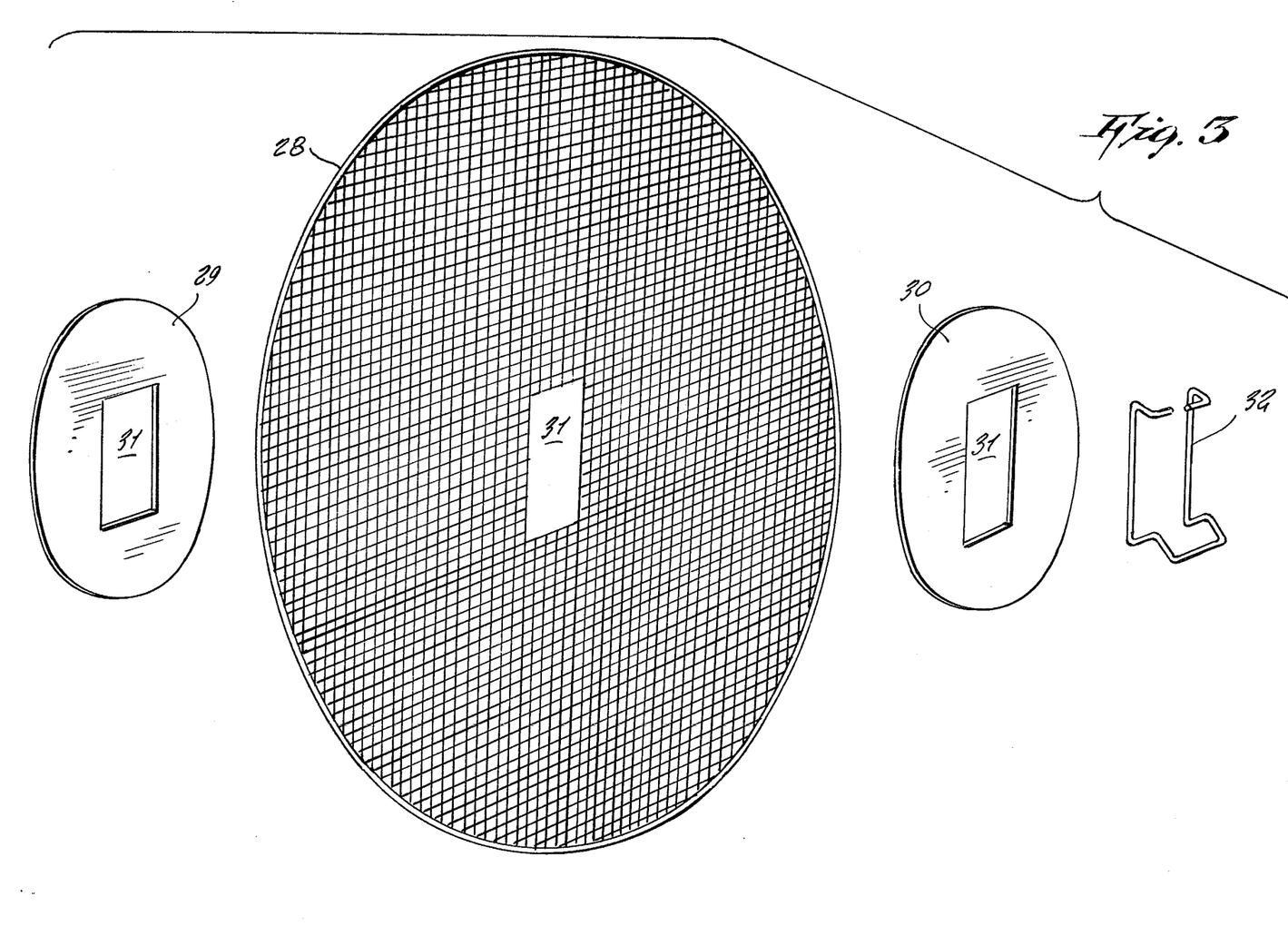
FIG. 3 shows, in an exploded view, the components of the shield.

The utensil 10 further includes a shield in the form of a screen seen generally at 27 in FIG. 1. The components of the shield 27 appear in the exploded drawing of FIG. 3. It includes, first, the screen 28, having, conveniently, a generally circular shape with a protective edge. Permanently attached to the front side of the screen 28 appears the front plate 29. The back plate 30 adjoins to the other side of the screen 28. The openings 31 occur in the front and back plates 29 and 30, respectively, and the screen 28. These openings 31 align with each other to form an opening through the entire shield 27 when the plates 29 and 30 attach to the screen 28.

The hook bracket 32 appears on the rear side of the rear plate 30. Soldered, for example, it remains permanently affixed there. The hook bracket 32 couples to the handle mount 33, shown in FIG. 4, to attach the shield 27 to the fork 11.

As illustrated in FIG. 6, the handle mount 33 permanently attaches to the handle 13. It has, in its front face, two openings, the larger of which allows the shaft 12 of the fork 11 to pass through, while the smaller allows the rod 22 to slide through. The hook bracket 32 may then engage the handle mount 33 to properly affix the shield 27 into its protecting position where it remains with a substantially fixed orientation relative to the fork 11.

The steps generally followed to place the shield 27 into its proper position on the fork 11 appear in FIGS. 7 through 11. The first step involves placing the prongs 15 of the fork 11 through the openings 31 in the screen 28 and the plates 29 and 30. For the relative dimensions of the components shown, this would generally involve having the separation of the prongs 15 lie parallel to the longer dimension of the opening 31.

Figures 7, 8, 9, 10, 11, 12:
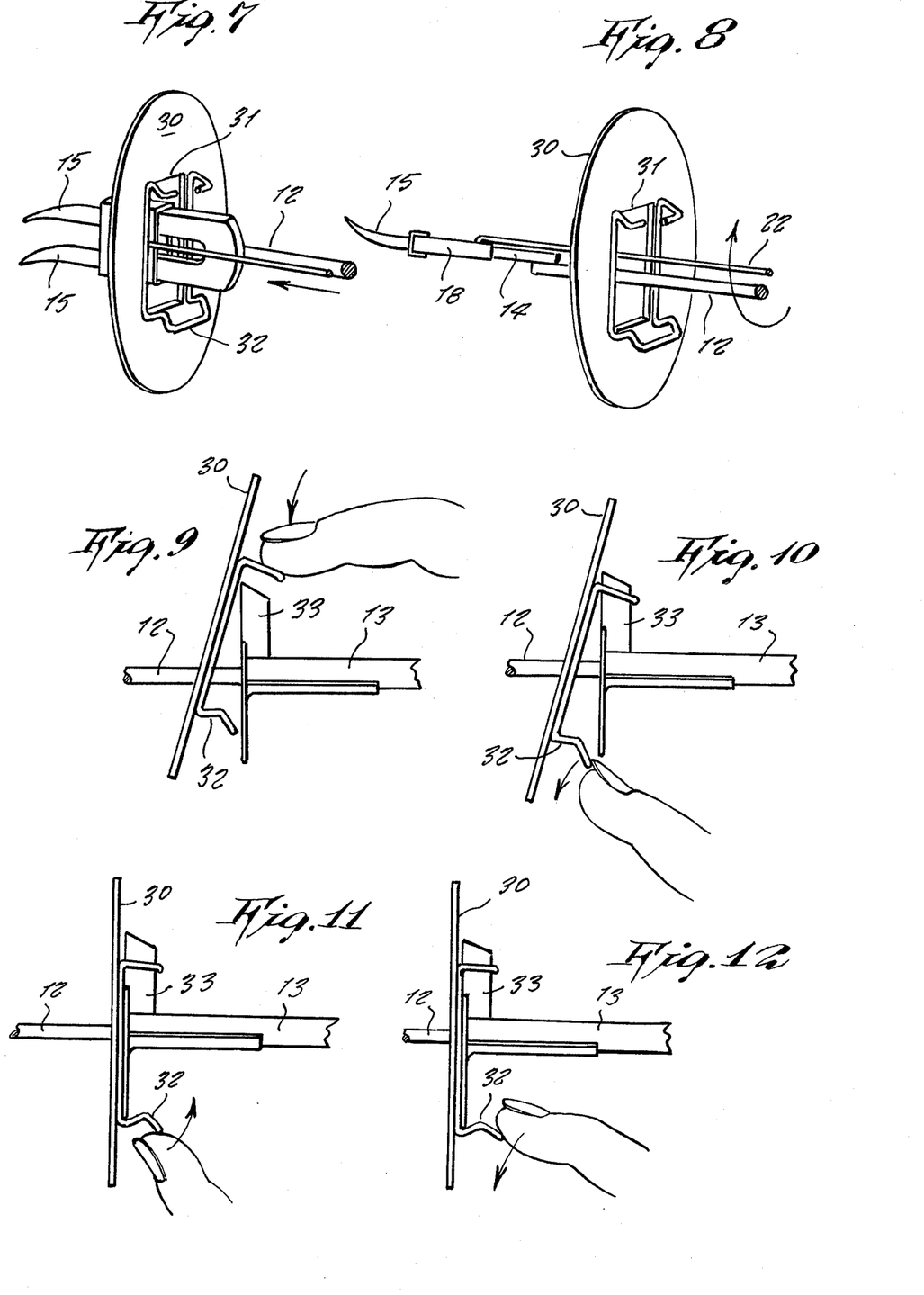
FIGS. 7 through 11 show various steps in installing the shield upon the fork.
FIG. 12 depicts the first step in removing the shield from the fork.

In FIG. 8, after the plate 14 has passed entirely through the openings 31, a quarter-turn of fork 11 in the proper direction properly aligns the shield 27 to the fork 11. Connecting the two proceeds by manipulating the shield 27 to place the upper portion of the hook bracket 31 over and around the top of the handle mount 33 as shown in FIG. 9. From this location, pushing down the hook bracket 32 on the shield 27 allows the top portion of the hook bracket to fully engage the upward extension of the handle mount 33.

Pushing down on the lower portion of the bracket 32, as in FIG. 10, forces the shield downward relative to the handle mount 33. The bottom portion of the hook bracket 32 can slip under the downward extension of the handle mount 33 to engage it. This latter engagement proceeds by pushing the bottom of the hook bracket 32 both simultaneously up and toward the rear of the handle 13 as seen in FIG. 11. In this position, the shield 27 has a fixed orientation relative to the fork 11 and stands ready for use.

To remove the shield 27 simply requires a reversal of the process described above. It begins with a downward push on the bottom of the hook bracket 32, illustrated in FIG. 12.

The sizes of both the fork 11 and the shield 27 can vary depending upon their intended use and users. However, a shield diameter of about 11 inches and a distance between the thumb actuator 23 and the dispenser 18 of approximately 7 inches provides a utensil 10 of practical dimensions.

Figures 13, 14, 17, 18:
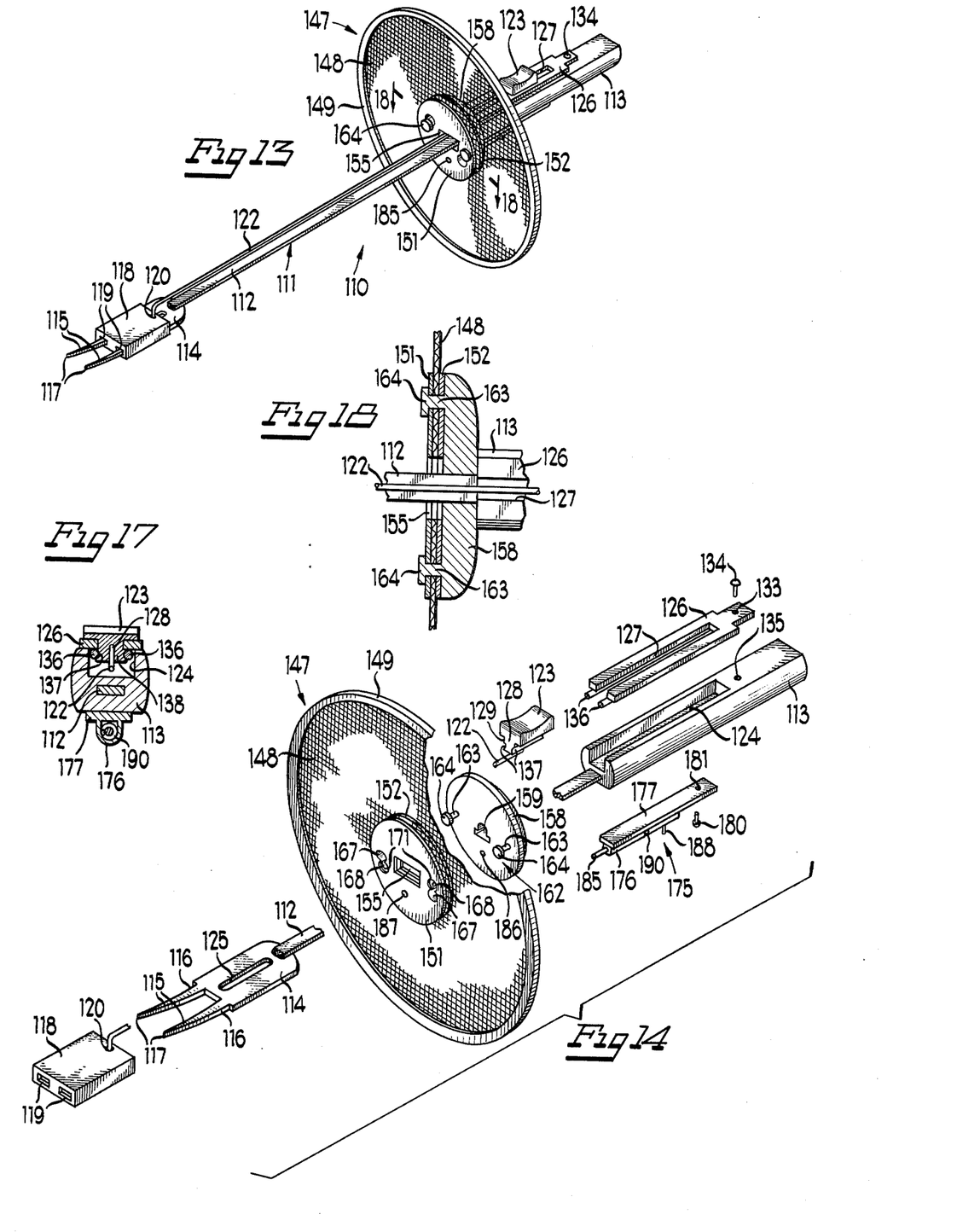
FIG. 13 shows a second form of a fork having a shield coupled to it.
FIG. 14 gives an exploded view of the components of the utensil of FIG. 13.
FIG. 17 gives a cross-sectional view along the line 17—17 of the fork of FIG. 15 showing the thumb actuator for the food ejector and its association with the handle.
FIG. 18 gives a cross-sectional view along the line 18—18 of the shield in FIG. 13 showing its coupling to the fork.

The utensil appearing generally at 110 in FIG. 13 includes the fork indicated at 111 with the shaft 112, and the handle 113. In this instance, the shaft 112 has a rectangular cross-section rather than the circular shaft of the prior figures.

Again, however, the forward end of the shaft 112 terminates in the plate 114 to which attach the prongs 115 having the bases 116 and the tips 117. The food ejector 118 has the openings 119 at its forward end to fit over the prongs 115. The front face of the ejector 118 again serves to dislodge food impaled upon the prongs 115.

The ejector 118 includes the opening 120 through its top to receive the downwardly offset front end 121 of the push rod 122. The rear end of the rod 122 terminates in the thumb actuator 123. The thumb actuator 123, the push rod 122, and the dispenser 118 all join together and move as a single unit to remove food from the fork 111.

The front end 121 of the rod 122 sits within the clearance slot 125 of the plate 114. This allows the end 121 of the rod 122 to move back and forth.

Figure 15:
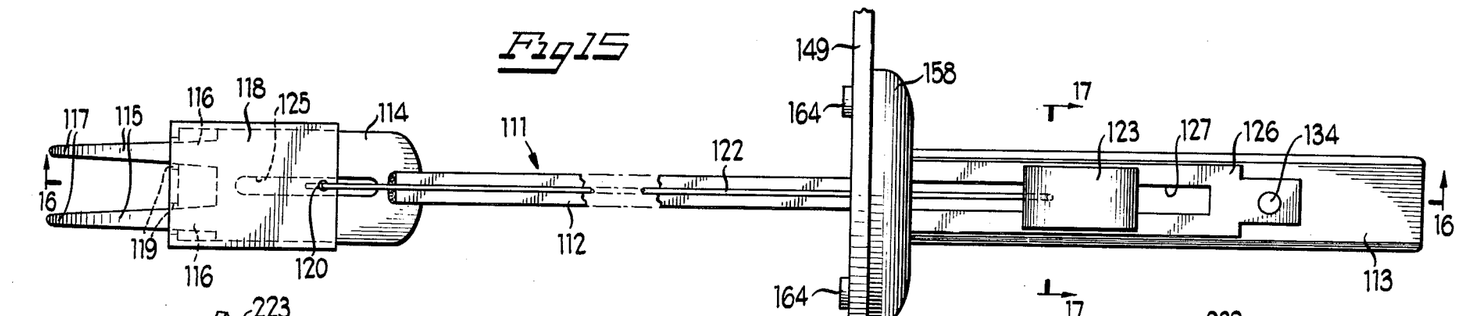
FIG. 15 has a top plan view of the fork and shield of FIG. 13.
Figures 16, 19, 20, 21:
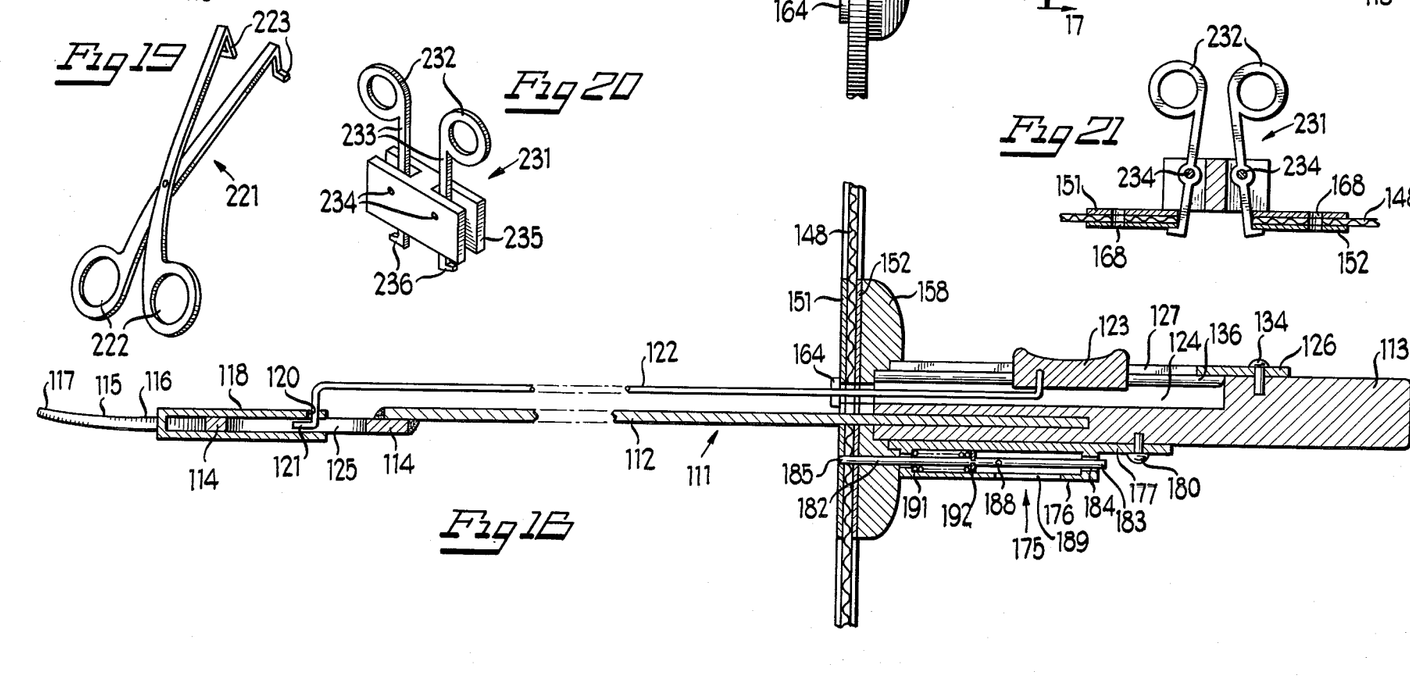
FIG. 16 presents a cross-sectional view along the line 16—16 of the fork of FIG. 15.
FIG. 19 shows one type of lifter device for raising the shield from, for example, the top of a pan.
FIG. 20 has a perspective view of an alternative type of lifting device.
FIG. 21 gives a cross-sectional view of the lifter device of FIG. 20 engaged with a screen shield.

Shown in FIGS. 14, 15 and 16, the thumb actuator 123 sits within the groove 124 of the handle 113. However, the plate 126 fits on top of the handle 113 and prevents actual contact between the handle 113 and the actuator knob 123. It avoids abrasion damage to the handle 113 as the actuator 123 moves back and forth. It also has the slit 127 which provides a narrow opening to the groove 124 and more accurately guides the actuator 123 in its longitudinal motion. As shown in FIG. 17, the thumb actuator 123 has a narrow central portion 128 terminated by the straight edges 129 which fit into the slot 127 of the plate 126.

The plate 126 also has the hole 133 through which the rivet 134 passes before entering the opening 135 in the handle 113. The rivet 134 holds the plate 126 to the handle 113.

Also, the plate 126 has attached to it the rods 136 on either side of the slit 127. These rods 136 fit within the semicircular channels 137 carved into the bottommost portion 138 of the actuator 123. As shown in FIG. 17, these rods 136 prevent the egress of the actuator 123 from the groove 124 in the handle 113.

Returning to FIG. 13, the utensil 110 also includes the shield indicated generally at 147. The shield 147 includes the screen 148 protected, at its outer edge, by the strip of metal 149. Attached to the screen 148 on either of its sides appears the front and back plates 151 and 152, respectively. The screen 148 and the plates 151 and 152 have the rectangular openings 155 passing through them. This allows these elements to pass over the food ejector 118, the prongs 115, and the plate 114 and along the shaft 112 and the rod 122 to attach or remove the screen 147 to or from the fork 111.

To hold the screen 147 rigidly to the fork 111, the handle 113 has permanently bonded to it the mounting block 158. In the center of the block 158 appears the opening 159 which allows the shaft 112 and the rod 122 to pass through, all of which appears in the exploded view of FIG. 14.

To connect to the screen 147, the mounting block 158 has, extended from it, the projections 162 with the shafts 163 and the heads 164. The plates 151 and 152, in turn, have passing through them at appropriate locations the larger circular openings 167 that connect with the smaller circular openings 168. The larger openings 167 have a sufficient dimension to pass over the heads 164 of the projections 162.

Once they have done so, a small turn of the screen 147 in the clockwise direction in FIGS. 13 and 14 will place the pins 163 of the projections 162 into the smaller openings 168. At this point, the heads 164 of the projections 162 will overlie the smaller openings 168 to prevent the shield 147 from moving away from the mounting block. This relationship appears clearly in the cross-sectional view of FIG. 18 which shows the heads 164 in firm contact with the front plate 151 to keep the shield against the mounting block 158 and properly positioned for use.

After use, turning the shield 147 in a counterclockwise direction in FIGS. 13 and 14 will align the larger openings 167 in the plates 151 and 152 with the heads 164. The larger openings 167 can then move past the heads 164 to allow the removal of the shield 147.

The projections 162 need not form a single contiguous piece with the block 158. Rivets or screws set into the block 158 should normally perform as well.

The accidental turning of the shield 147 may result in its impropitious disengagement from the block 158. To prevent this, the front plate 151 may have slight depressions 171 around the smaller openings 167 but sufficiently large for the heads 164 to set in. The stems 163 of the projections 162 barely have sufficient length to allow the heads 164 to pass through the plates 151 and 152. Consequently, after the shield 147 turns clockwise to engage with the block 158, the heads 164 will sit tightly within the depressions 171. This tight fit of the heads 164 in the depressions 171 may prevent the accidental and undesired counterclockwise rotation of the screen 147. As a result, it cannot dislodge from its operational position.

The indentations 171 in the front plate 151, however, may not completely prevent accidental dislodgement of the shield 147. Thus, the utensil 110 may also include the safety device, indicated generally at 175 in FIGS. 14 and 16. This device 175 first includes a housing 176 having a flat upper surface 177 which abuts against the underside of handle 113 where the rivet 180 passing through the opening 181 securely holds it. Inside of the housing 176 sits the short rod 182 which may move forward and backward there. In its most rearward position, its rear end 183 extends beyond the opening 184 in the housing 176. Pushing the rear 183 of the rod 182 forward, however, results in its front end 185 passing through the opening 186 in the block 158 and then extending into the openings 187 in the plates 151 and 152. This engagement of the front end 185 of the rod 182 with the openings 187 in the plates 151 and 152 prevents the counterclockwise rotation of the shield 147. Thus, it precludes the shield's disengagement from its operational position.

The rod 182 also has the projection 188 which normally passes through the opening 189 in the bottom of the housing 176. However, with the rod 182 in its forward position, the projection 188 may rotate and enter the lateral extension 190 of the opening 189 as seen more clearly in FIG. 14. There, it prevents the rod 182 from moving backwards to allow the removal of its front end 185 from the openings 187 in the shield 147. Thus, placing the projection 188 into the opening 190 maintains the rod 182 in a position to prevent the dislocation of the shield 147 from its operational position.

Placing the projection 188 back into the opening 189 on the bottom of the housing 176, however, allows the rod 182 to once again move rearward. The spring 191 pushes against both the forward bulk head of the housing 176 and the fins 192 attached to the rod 182 to move it backward. As the rod 182 moves backward, its forward end 185 retracts from the opening 187 in the plates 151 and 152 and allows the usual removal of the shield 147.

A device which may have greater desirability and perhaps lower cost than that seen at 175 in the figures may be the usual projecting mechanism in the inexpensive retractable ballpoint pens. In its extended position, it would prevent the accidental removal of the screen.

The shield 147 also finds use in simply preventing the splattering of grease from a frying pan. It may simply lie upon the pan to prevent the egress of grease from the inside. The devices shown in FIGS. 19 through 21 allow for the facile removal of the screen when used in such a manner.

In particular, the lifter shown generally at 221 in FIG. 19 has the basic shape of a pair of scissors with the rings 222 for the insertion of the fingers. At the ends opposite from the openings 222 appear the downward and outward extensions 223. These may fit inside of the openings 155 in the screen 148 and the plates 151 and 152, press against the sides of the opening, and lift the shield 147 from the pan.

Similarly, the devices shown are generally at 231 in FIGS. 20 and 21 include the rings 232 for insertion of fingers. The stems 233 connect to the rings and pivot about the axes 234 set into the H-shaped block 235. At the bottom of the stems 233 appear the feet 236 which can grab onto the plates 151 and 152 to lift the screen 147 from the frying pan as shown in FIG. 21.

A further type of device may simply have a handle with T-shaped projections extending from its side near its end. These projections could have the same spacing and dimensions as the projections 162 in the mounting block 158. These projections could then allow the attachment of the shield 147 to the handle in the same way it attaches to the utensil 111. In this configuration, the handle could remain attached to the shield throughout its use during the cooking operation. It need not be placed in a different location during the shield's use as do those shown in FIGS. 19 through 21.

Accordingly, what is claimed is:

1. A protective hot item utensil comprising:
   (a) elongated manipulating means including, at a first end, handle means for permitting the manual holding of said manipulating means, and, at a second end, retaining means for making contact with a hot item;
   (b) shield means for preventing heated particles, traveling in a substantially straight line from the region in proximity to said retaining means, from reaching the region in proximity to said handle means; and
   (c) coupling means including two parts, the first of said parts being coupled to said manipulating means and the second of said two parts being coupled to said shield means, said first and second parts being engageable with and disengageable from each other, for, when said first and second parts are engaged with each other, retaining said shield means at a predetermined location on and with a fixed orientation relative to said manipulating means.

2. The utensil of claim 1 wherein said manipulating means is adapted to hold portions of food and said shield means includes a substantially flat screen extending laterally from said manipulating means when said coupling means retains said shield means to said manipulating means.

3. The utensil of claim 2 wherein said coupling means retains said shield means at either one of two fixed orientations relative to said manipulating means.

4. The utensil of claim 2 wherein said shield means has an opening through, and interior of the lateral edges of, said screen sufficiently large to allow said screen to pass over at least one of said ends of said manipulating means.

5. The utensil of claim 4 wherein said first part of said coupling means is rigidly affixed to said manipulating means, said second part of said coupling means is rigidly affixed to said shield means, and said first and second parts, when engaged with each other, hold said shield means and said manipulating means in a fixed orientation with respect to each other unchangeable without disengaging said first and second parts from each other.

6. The utensil of claim 5 further including ejecting means coupled to said manipulating means for disengaging from said manipulating means food held by said retaining means.

7. The utensil of claim 6 wherein said ejecting means extends between said retaining means and said handle means and passes through said shield means when said first and second parts of said coupling means are engaged with each other.

8. The utensil of claim 7 wherein said manipulating means is a fork and said ejecting means pushes an item of food held by said fork in a direction away from said handle means.

9. The utensil of claim 5 further including lifting means, engageable with and disengageable from said second part of said coupling means when said second part is disengaged from said first part, for manually carrying said shield means without the necessity of manual contact with said shield means.

10. A protective hot item utensil comprising:
    (a) elongated manipulating means including, at a first end, handle means for permitting the manual holding of said manipulating means and, at a second end, retaining means for making contact with a hot item;
    (b) shield means for preventing heated particles, traveling in a substantially straight line from the region in proximity to said retaining means, from reaching the region in proximity to said handle means;
    (c) coupling means for retaining said shield means in proximity to said manipulating means;
    (d) ejecting means coupled to said manipulating means for disengaging from contact with said retaining means an item of food in contact therewith; and
    (e) lifting means, engageable with and disengageable from said shield means when said shield means is not retained by said coupling means in proximity to said manipulating means, for manually carrying said shield means without the necessity of manual contact with said shield means.

11. The utensil of claim 10 wherein said utensil is a cooking utensil and wherein said ejecting means extends between said retaining means and said handle means and passes through said shield means when said coupling means retains said shield means in proximity to said manipulating means.

12. The utensil of claim 11 wherein said manipulating means is a fork and said ejecting means pushes an item on the fork away from said handle means.

13. The utensil of claim 12 wherein said shield means includes a substantially flat screen and has an opening through said screen interior of the lateral edges of said screen sufficiently large to allow said screen to pass over at least one of said ends of said manipulating means.

14. The utensil of claim 12 wherein said coupling means includes two parts, the first part of said coupling means being rigidly affixed to said manipulating means, the second part of said coupling means being rigidly affixed to said shield means, said first and second parts being engageable with and disengageable from each other, and, when engaged with each other, holding said shield means and said manipulating means in a fixed orientation with respect to each other unchangeable without disengaging said first and second parts from each other.

15. The utensil of claim 14 further including lifting means engageable with and disengageable from said second part of said coupling means when said second part is disengaged from said first part for manually carrying said shield means without the necessity of manual contact with said shield means.

* * * * *